Figure 1:
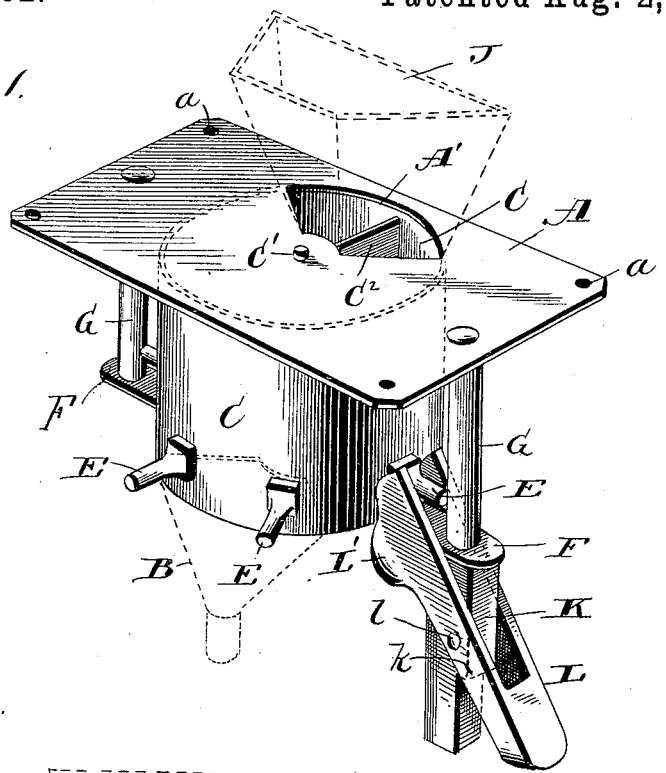

(No Model.)

J. M. HEATH.
DEVICE FOR MEASURING SHOT.

No. 479,982. Patented Aug. 2, 1892.

Witnesses
C. J. Williamson
A. L. Hough

Inventor
John M. Heath
by Franklin H. Hough
his Atty.

THE NORRIS PETERS CO., PHOTO-LITHO., WASHINGTON, D. C.

UNITED STATES PATENT OFFICE.

JOHN M. HEATH, OF TALBOTTON, GEORGIA.

DEVICE FOR MEASURING SHOT.

SPECIFICATION forming part of Letters Patent No. 479,982, dated August 2, 1892.

Application filed April 23, 1892. Serial No. 430,351. (No model.)

*To all whom it may concern:*

Be it known that I, JOHN M. HEATH, a citizen of the United States, residing at Talbotton, in the county of Talbot and State of Georgia, have invented certain new and useful Improvements in a Device for Measuring Shot, &c.; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in devices for measuring substances, and although it is designed primarily for measuring shot and will be so shown and described in this specification it is to be distinctly understood that the invention is not in any way restricted to such use.

The objects and advantages of the invention will hereinafter appear, and the novel features thereof will be specifically defined by the appended claims.

The invention in the present instance resides in the peculiar combination and the construction, arrangement, and adaptation of the parts, all as more fully hereinafter described, shown in the drawings, and then particularly pointed out in the claims.

The invention is clearly illustrated in the accompanying drawings, which, with the letters of reference marked thereon, form a part of this specification, and in which—

Figure 2:
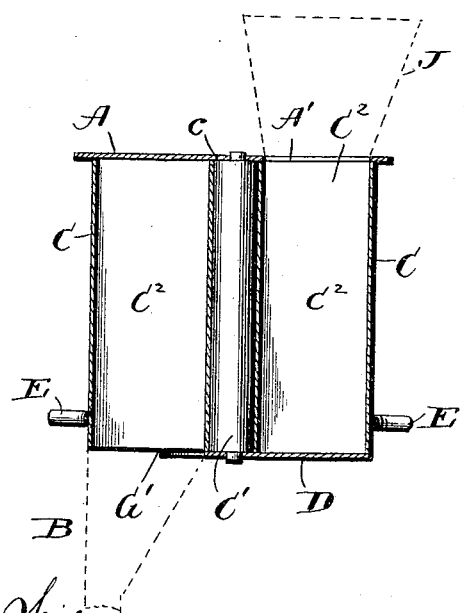
Figure 3:
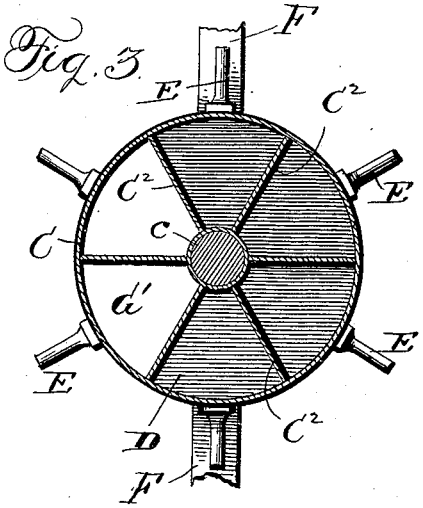

Figure 1 is a perspective view of my improvement; Fig. 2, a vertical section through the same. Fig. 3 is a cross-section through the cylinder, looking downward.

Like letters of reference indicate like parts throughout the several views in which they occur.

Referring now to the details of the drawings by letter, A represents the top plate, of any desired material and size, preferably of metal and of rectangular form, as seen best in Fig. 1. This plate may be supported in any suitable manner. It may be provided with holes $a$ for the reception of securing means for holding in position, or it may be suspended or supported above the floor, counter, or wherever it is to be located. This plate has an opening A' near the center of its length, and this opening is formed with its outer edge on the arc of a circle, as seen in Fig. 1, and the opening is of a size and shape corresponding to the two adjacent chambers or compartments of the cylinder.

C is a receptacle, preferably cylindrical and mounted to revolve about a vertical pivot C'. It may be of any desired diameter and is divided into a plurality of compartments by the vertical partitions $C^2$, which are supported in any suitable manner. The pivot or axis of the cylinder may be of any suitable character. In this instance it is shown as a vertical shaft, the lower end of which is stepped in the bottom plate D and its upper end in the top plate, the shaft passing through a central vertical chamber $c$. This cylinder may be revolved in any suitable manner by a crank, gearing, or simply by the hands of the operator upon the radial projections E near the lower end of the cylinder. The bottom plate is shown as provided with diametrically-opposite arms F, which are secured to the bottoms of the posts G, which may be supported from the top plate or otherwise. The bottom plate has an opening G' therein at its lower edge corresponding in size and shape to that in the top plate, but upon diametrically-opposite sides of the device. Beneath this opening there is designed to be secured a spout or funnel B of any desired character, suitable to convey the shot or other material from the cylinder to a bag or other receptacle into which it is desired to deliver the shot. This funnel or spout may be held in any suitable position. The cover remains stationary while the cylinder revolves, or vice versa.

The projections E may be of any desired form. They may be protuberances on the cylinder or they may be bolts or pins projecting therefrom, or any preferred construction may be employed.

The operation will be readily understood. The device is affixed in position, as seen in Fig. 1. The tops or mouths of two of the chambers or compartments are always open. The shot or other material may be introduced into the compartments in any suitable way— as, for instance, from a hopper J—and when one or both compartments are filled the cylinder is revolved until that compartment or the filled compartments are opposite the opening in the bottom plate, when the material will be discharged through the opening in the bottom plate and through the funnel into the bag or other place of deposit.

In order to hold the cylinder against revolution when not in use, I have provided a locking device, (seen in Fig. 1,) and which consists of the upright K, supported beneath one of the posts G and provided with a shoulder k, and to this upright is pivoted upon a horizontal pivot l the arm L, the upper portion of which is bifurcated to embrace the upright and the arm of the top plate. The upper end of this arm is weighted, as seen at L', so that the normal tendency thereof will be to project the bifurcated end toward the cylinder and between which one of the projections on the cylinder will be held to prevent its rotation. When it is desired to rotate the cylinder, this arm is thrown outward to clear the projection, when the cylinder will be free to be revolved.

The device is simple, cheap of manufacture, and in practice has proved most efficient for the purposes for which it is intended.

What I claim as new is—

1. A rotatable compartment-cylinder having radial projecting arms for rotating it, combined with a gravity locking device engaging any of said arms, and a top and bottom plate having openings, as set forth.

2. The combination, with the cylinder with its compartments, projections, and top and bottom plates with openings, of a bifurcated gravity locking device engaging any of said arms for said cylinder, as set forth.

3. The device described, consisting of the cylinder having compartments and radial projecting arms for revolving it and a top and bottom plate with openings arranged as described, and a pivoted weighted locking device having bifurcated ends to receive any one of said projections, substantially as specified.

In testimony whereof I affix my signature in presence of two witnesses.

JOHN M. HEATH.

Witnesses:
  RICHARD H. LEONARD,
  T. B. KING.